US009456330B2

(12) United States Patent
Cheng et al.

(10) Patent No.: US 9,456,330 B2
(45) Date of Patent: Sep. 27, 2016

(54) TWO-STAGE DEVICE-TO-DEVICE (D2D) DISCOVERY PROCEDURES

(71) Applicants: Alcatel-Lucent USA Inc., Murray Hill, NJ (US); Alcatel Lucent, Boulogne-Billancourt (FR)

(72) Inventors: Fang-Chen Cheng, Randolph, NJ (US); Said Tatesh, Swindon (GB)

(73) Assignee: Alcatel Lucent, Boulogne-Billancourt (FR)

( * ) Notice: Subject to any disclaimer, the term of this patent is extended or adjusted under 35 U.S.C. 154(b) by 65 days.

(21) Appl. No.: 14/448,148

(22) Filed: Jul. 31, 2014

(65) Prior Publication Data

US 2015/0043545 A1    Feb. 12, 2015

Related U.S. Application Data

(60) Provisional application No. 61/864,464, filed on Aug. 9, 2013.

(51) Int. Cl.

| H04J 3/00 | (2006.01) |
|---|---|
| H04W 8/00 | (2009.01) |
| H04W 56/00 | (2009.01) |
| H04W 72/04 | (2009.01) |
| H04L 27/26 | (2006.01) |
| H04W 76/02 | (2009.01) |

(Continued)

(52) U.S. Cl.
CPC .......... *H04W 8/005* (2013.01); *H04J 11/0069* (2013.01); *H04J 13/0003* (2013.01); *H04J 13/0062* (2013.01); *H04L 27/2613* (2013.01); *H04L 27/2655* (2013.01); *H04W 56/00* (2013.01); *H04W 56/0005* (2013.01); *H04W 72/04* (2013.01); *H04W 76/023* (2013.01)

(58) Field of Classification Search
USPC ........ 370/336, 335, 328, 329, 338, 310, 350
See application file for complete search history.

(56) References Cited

U.S. PATENT DOCUMENTS

| 2009/0237327 A1* | 9/2009 | Park ................... G02B 27/2264 345/8 |
|---|---|---|
| 2012/0140714 A1* | 6/2012 | Koskela ................ H04W 56/00 370/329 |

FOREIGN PATENT DOCUMENTS

WO    2014162200 A2    10/2014

OTHER PUBLICATIONS

"D2D Discovery Design for Groupcast, Broadcast, and Relay", 3GPP TSG RAN WG1 Meeting #74 R1-132995, Aug. 19, 2013, 6 pages.

(Continued)

*Primary Examiner* — Chi H Pham
*Assistant Examiner* — Alexander O Boakye
(74) *Attorney, Agent, or Firm* — Davidson Sheehan LLP

(57) ABSTRACT

First user equipment transmits a first synchronization signal and a second synchronization signal that are assigned to the first user equipment for device-to-device (D2D) communication. The first synchronization signal indicates a timing reference for D2D communication and a combination of the first synchronization signal and the second synchronization signal indicate resources allocated to the first user equipment to transmit discovery information for D2D communication. First user equipment detects a first synchronization signal and a second synchronization signal that are assigned to second user equipment for D2D communication.

28 Claims, 9 Drawing Sheets

(51) Int. Cl.
*H04J 11/00* (2006.01)
*H04J 13/00* (2011.01)

(56) References Cited

OTHER PUBLICATIONS

"Study on LTE Device to Device Proximity Services", 3GPP TSG RAN Meeting 358 RP-122009, Dec. 4, 2012, 6 pages.
M. Scott Corson et al., "Toward Proximity-Aware Internetworking", IEEE Wireless Communications Magazine, Dec. 1, 2010, 8 pages.
Lei Zhang et al., "Neighbor Discovery for Wireless Networks via Compressed Sensing", <http://arxiv.org/pdf/1012.1007.pdf> May 22, 2012, 29 pages.
"Discussion of D2D Discovery Methods", 3GPP TSG RAN WG1 Meeting #73, R1-132068, May 20, 2013, 5 pages.
International Search Report and Written Opinion correlating to PCT/US2014/050263 dated Mar. 27, 2015, 12 pages.

* cited by examiner

TWO-STAGE DEVICE-TO-DEVICE (D2D) DISCOVERY PROCEDURES

CROSS REFERENCE TO RELATED APPLICATIONS

This application claims priority to the U.S. Provisional Patent Application 61/864,464, filed on Aug. 9, 2013, the entirety of which is incorporated herein by reference.

BACKGROUND

1. Field of the Disclosure

The present disclosure relates generally to communication systems and, more particularly, to wireless communication systems.

2. Description of the Related Art

Wireless communication systems provide wireless connectivity to user equipment using a network of interconnected access nodes or base stations. Communication over the air interface between the user equipment and the base stations take place according to various agreed-upon standards and/or protocols. For example, the Third Generation Partnership Project (3GPP, 3GPP2) has specified a set of standards for a packet-switched wireless communication system referred to as Long Term Evolution (LTE). The LTE standards support access schemes including single-carrier frequency division multiple access (SC-FDMA). Multiple users can concurrently access the SC-FDMA network using different sets of non-overlapping Fourier-coefficients or sub-carriers. One distinguishing feature of SC-FDMA is that it leads to a single-component carrier transmit signal. The LTE standards also support multiple-input/multiple-output (MIMO) communication over the air interface using multiple antennas deployed at transmitters and/or receivers. The carrier bandwidth supported by LTE is approximately 20 megahertz (MHz), which can support a downlink peak data rate of approximately 100 megabits per second (Mbps) and a peak data rate of the uplink of approximately 50 Mbps.

User equipment may implement transceivers that include a transmitter for transmitting uplink signals towards the network and a receiver for receiving downlink signals transmitted by the network. Transceivers implemented in user equipment may communicate according to the SC-FDMA standards or protocols using different sets of non-overlapping Fourier-coefficients or sub-carriers. User equipment conventionally communicate with each other by transmitting signals over a communication path that originates at the transmitter of the first user equipment, travels over an uplink (or reverse link) to a receiver in a network base station, proceeds to a transmitter in the receiving base station or another base station, and is then transmitted over a downlink (or forward link) to a receiver in the second user equipment.

Device-to-device (D2D) communication refers to information exchanged between two wireless communication devices over a communication path that does not necessarily include the network in the communication path. For example, D2D communication allows two user equipments to communicate directly with each other over an air interface between the two user equipments without including any network elements in the D2D communication path. The D2D communication protocols can be used to support voice or data transmission on a one-to-one basis (unicast), on a one-to-many basis (groupcast) for applications such as push-to-talk (PTT), or on a one-to-all basis (broadcast). User equipment can also serve as relay stations for D2D communication between other user equipment. The absence of network support should not interfere with D2D communication and user equipment can perform D2D communication in either an in-coverage scenario (when user equipment are able to communicate with the network) or an out-of-coverage scenario (when user equipment are not in communication with the network).

SUMMARY OF EMBODIMENTS

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In some embodiments, a method is provided for transmitting signals used for D2D discovery. Some embodiments of the method include transmitting, from first user equipment, a first synchronization signal and a second synchronization signal that are assigned to the first user equipment for device-to-device (D2D) communication. The first synchronization signal indicates a timing reference for D2D communication and a combination of the first synchronization signal and the second synchronization signal indicate resources allocated to the first user equipment to transmit discovery information for D2D communication.

In some embodiments, a method is provided for detecting signals for D2D discovery. Some embodiments of the method include detecting, at first user equipment, a first synchronization signal and a second synchronization signal that are assigned to second user equipment for device-to-device (D2D) communication. The first synchronization signal indicates a timing reference for D2D communication and a combination of the first synchronization signal and the second synchronization signal indicate resources allocated to the second user equipment to transmit discovery information for D2D communication.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

User equipment can efficiently discover other user equipment for D2D communication by transmitting or receiving a primary synchronization signal and a secondary synchronization signal that may be assigned to each user equipment by a D2D controller during activation of the user equipment for D2D communication. The primary synchronization signal may be used to synchronize timing between user equipment for D2D communication, e.g., by defining frame timing boundaries. A combination of the primary synchronization signal and the secondary synchronization signal may be used to identify a discovery channel that is used to convey information identifying the user equipment. For example, the primary synchronization signal may indicate a subframe that includes the discovery channel and the secondary synchronization signal may indicate resource elements within the subframe that are used to support the discovery channel. In some embodiments, the primary synchronization signal and the secondary synchronization signal are also used as hierarchical indexes that indicate other characteristics of the D2D communication. For example, different values of the primary synchronization signal may be used to indicate that the D2D communication is unicast, groupcast, broadcast, or relay communication. The secondary synchronization signal may then be used to identify members of a unicast group, a groupcast, a broadcast group, or a relay group. User equipment may then filter received signals based on the primary synchronization signals. For example, user equipment may filter out secondary synchronization signals associated with a groupcast primary synchronization signal if the user equipment is not a member of the group.

Figure 1:
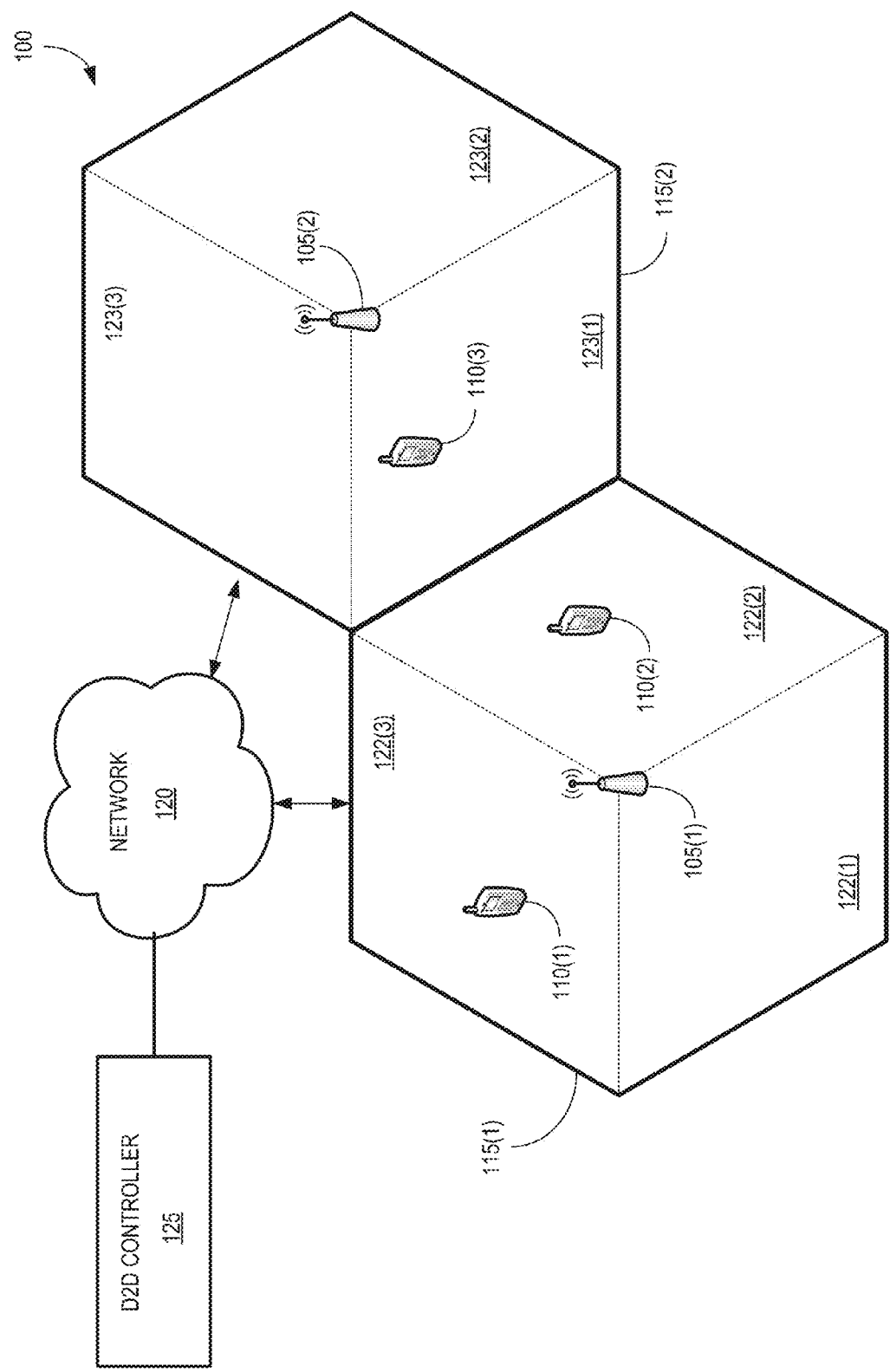
FIG. 1 is a block diagram of a first example of a wireless communication system according to some embodiments.

FIG. 1 is a block diagram of a first example of a wireless communication system 100 according to some embodiments. In the illustrated embodiment, the wireless communication system 100 includes one or more base stations 105 that are configured to provide wireless connectivity to user equipment 110 in corresponding cells 115. As used herein, the term "base station" refers to a network element that provides wireless connectivity including access points, access networks, eNodeBs, macrocells, microcells, femtocells, and the like. As used herein, the term "user equipment" refers to any wireless communication device that can communicate with the wireless communication system 100 over an air interface with one or more of the base stations 105.

The illustrated embodiment of the wireless communication system 100 includes a network 120 for facilitating communication between network elements such as the base stations 105 and other elements within the system 100 or elements that are external to the system 100. Communication between the base stations 105 and user equipment 110 may be performed according to the Long Term Evolution (LTE) standards or protocols defined by the Third Generation Partnership Project (3GPP, 3GPP2) for packet-switched wireless communication systems. However, persons of ordinary skill in the art having benefit of the present disclosure should appreciate that the standards or protocols are intended to be exemplary and alternative embodiments may use other standards or protocols for supporting communication within the wireless communication system 100.

Each cell 115 is subdivided into sectors 122, 123 that may be served independently. For example, the base stations 105 may implement or deploy antenna configurations and hardware, firmware, or software that allows the user equipment 110 in the different sectors 122, 123 to be served independently. User equipment 110 may hand off when they transition between different sectors 122, 123. Although the cells 115 are depicted in FIG. 1 as perfect hexagons and the sectors 122, 123 are depicted as identical parallelograms that perfectly subdivide the cells 115, persons of ordinary skill in the art having benefit of the present disclosure should appreciate that actual cells 115 or sectors 122, 123 may have irregular shapes that may overlap with each other or vary in time due to geography, topography, environmental conditions, configuration of the base stations 105, changing antenna configurations, or other factors.

Transmissions over the air interface are divided into frames to facilitate synchronization of communication between the base stations 105 and user equipment 110.

Figure 2:
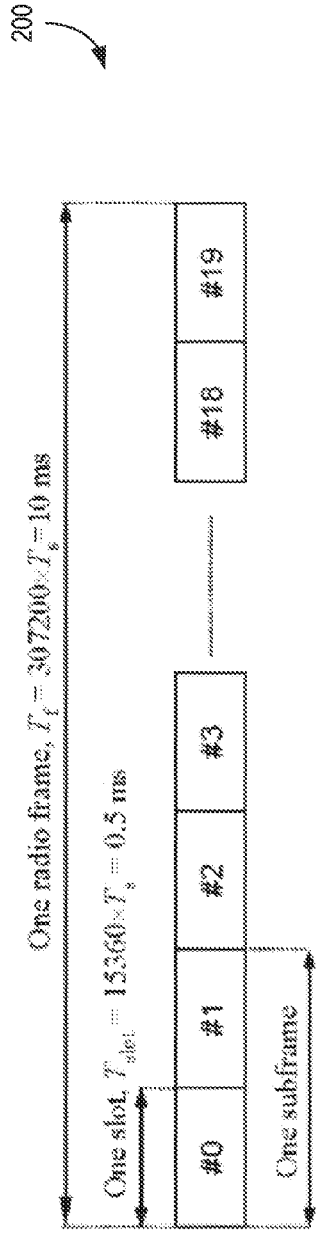
FIG. 2 is a diagram of a radio frame that may be used for frequency division duplex transmissions over an air interface according to some embodiments.
Figure 3:
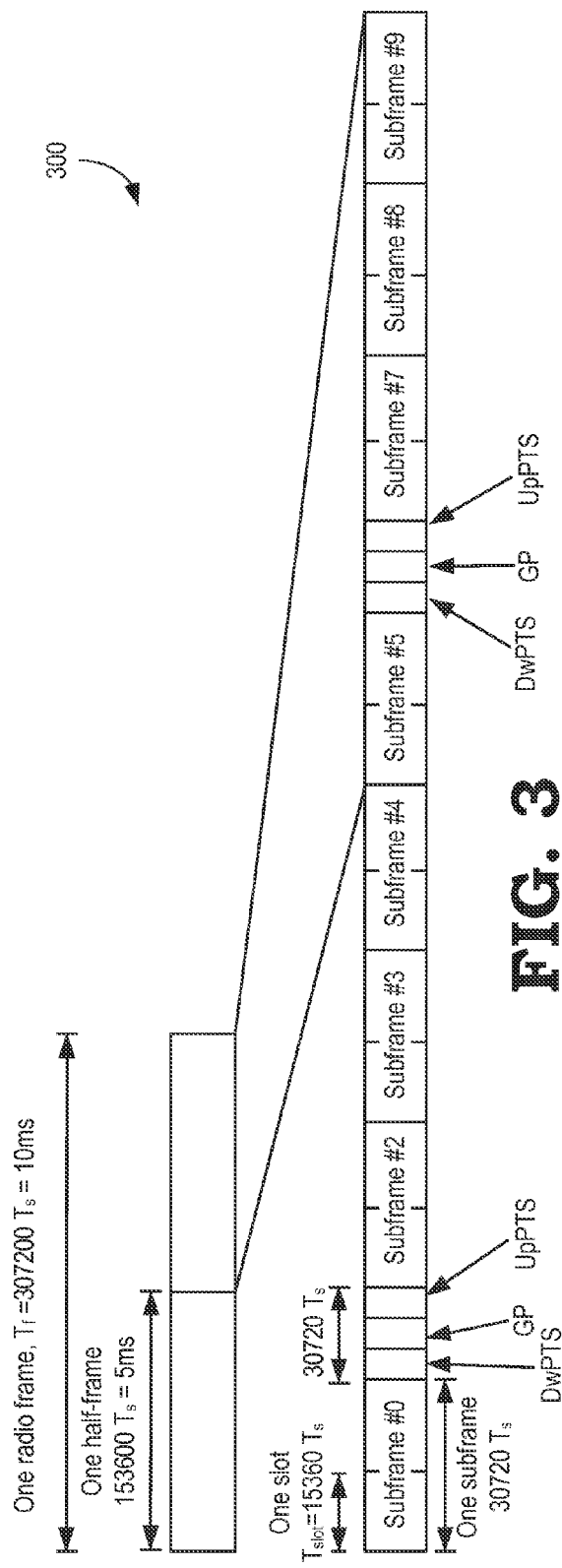
FIG. 3 is a diagram of a radio frame that may be used for time division duplex transmissions over an air interface according to some embodiments.

FIG. 2 is a diagram of a radio frame 200 that may be used for frequency division duplex transmissions over the air interface according to some embodiments. In the illustrated embodiment, the frame 200 is divided into subframes that are further divided into slots. FIG. 3 is a diagram of a radio frame 300 that may be used for time division duplex transmissions over the air interface according to some embodiments. The frame 300 is divided into half-frames, which are further divided into a plurality of subframes. One subset of the subframes may be divided into two slots. Special subframes may include slots that are used to convey the downlink pilot signal (DwPTS) and the uplink pilot signal (UpPTS). The uplink and downlink pilot signal slots are separated by a guard band (GP).

Figure 4:
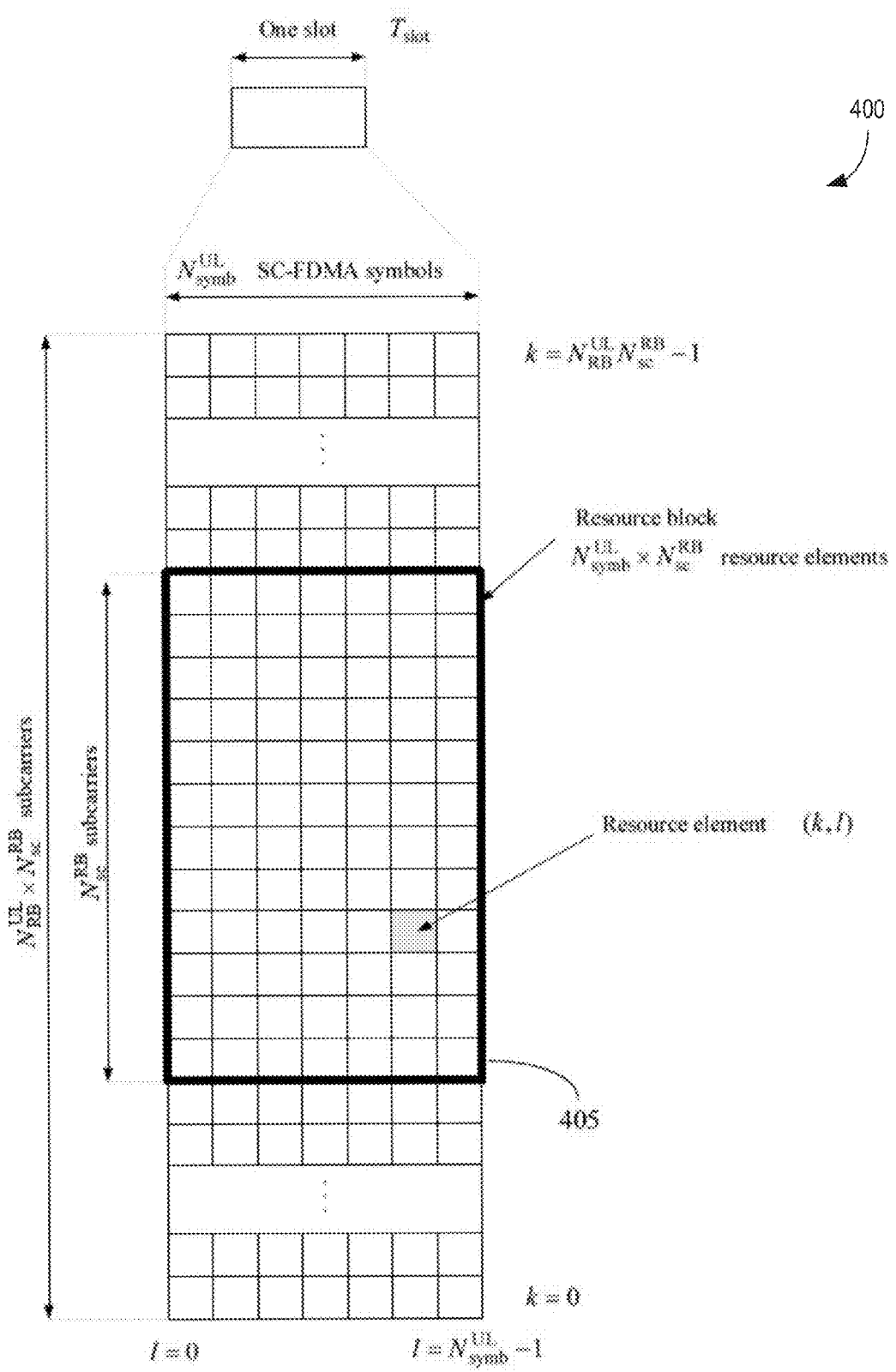
FIG. 4 is a diagram of a slot according to some embodiments.

FIG. 4 is a diagram of a slot 400 according to some embodiments. In the illustrated embodiment, the slot 400 is an uplink component carrier that is used for single carrier frequency division multiple access (SC-FDMA) communication over an air interface. Embodiments of structures such as the structure of the slot 400 depicted in FIG. 4 may also be used for downlink slots. FIG. 4 depicts one exemplary uplink time slot, $T_{slot}$. The transmitted signal in each slot is described by one or several resource grids 405 of $N_{RB}^{UL} N_{sc}^{RB}$ subcarriers and $N_{symb}^{UL}$ SC-FDMA symbols. The quantity $N_{RB}^{UL}$ depends on the uplink transmission bandwidth configured in the cell and in embodiments that conform to the 3GPP standards, the quantity fulfills the condition:

$$N_{RB}^{min,UL} \leq N_{RB}^{UL} \leq N_{RB}^{max,UL}$$

where $N_{RB}^{min,UL}=6$ and $N_{RB}^{max,UL}=110$ are the smallest and largest uplink bandwidths, respectively, in some embodiments. The number of SC-FDMA symbols in a slot may depend on the cyclic prefix length configured by a higher layer parameter UL-CyclicPrefixLength.

Each element in the resource grid 405 may be referred to as a resource element and can be uniquely defined by the index pair (k,l) in a slot where k=0, . . . , $N_{RB}^{UL} N_{sc}^{RB}-1$ and l=0, . . . , $N_{symb}^{UL}-1$ are the indices in the frequency and time domains, respectively. Resource element (k,l) on antenna port p corresponds to the complex value $a_{k,l}^{(p)}$. When there is no risk for confusion, or no particular antenna port is specified, the index p may be dropped. Quantities $a_{k,l}^{(p)}$ corresponding to resource elements not used for transmission of a physical channel or a physical signal in a slot may be set to zero. A physical resource block may be defined as $N_{symb}^{UL}$ consecutive SC-FDMA symbols in the time domain and $N_{sc}^{RB}$ subcarriers in the frequency domain. Exemplary values of $N_{symb}^{UL}$ and $N_{sc}^{RB}$ are given by Table 1. In the illustrated embodiment, a physical resource block in the uplink consists of $N_{symb}^{UL} \times N_{sc}^{RB}$ resource elements, corresponding to one slot in the time domain and 180 kHz in the frequency domain.

TABLE 1

Exemplary resource block parameters.

| Configuration | $N_{sc}^{RB}$ | $N_{symb}^{UL}$ |
| --- | --- | --- |
| Normal cyclic prefix | 12 | 7 |
| Extended cyclic prefix | 12 | 6 |

The relation between the physical resource block number $n_{PRB}$ in the frequency domain and resource elements (k,l) in a slot may be given by the formula:

$$n_{PRB} = \left\lfloor \frac{k}{N_{sc}^{RB}} \right\rfloor$$

Referring back to FIG. 1, wireless communication system 100 includes one or more D2D controllers 125 that are used to configure or control D2D communication within the wireless communication system 100. As used herein, the term "D2D communication" refers to communication between at least two user equipments 110 that does not include network elements such as base stations 105 in the communication path between the user equipment 110 that are participating in the D2D communication session. Thus, D2D communication occurs over an air interface established between the different user equipment 110 involved in the D2D communication session. The D2D communication can occur over an air interface established between two user equipment or over an air interface shared by more than two user equipments. Although network elements such as the base stations 105 are not in the communication path during D2D communication, the network may still participate in or monitor the communication. For example, the network may provide a network timing reference that can be used by the user equipment 110 as the reference time for deriving the timing of other user equipment during the D2D communication. Furthermore, the network may monitor D2D communication between two or more user equipment, e.g., so that the network can manage the radio resource and control the users for "leasing" air interface resources for the D2D communication.

The D2D controller 125 is depicted in FIG. 1 as a stand-alone entity that can communicate with the base stations 105 via the network 120. However, some embodiments of the D2D controller 125 may be deployed in different locations or in a distributed fashion at multiple locations in the wireless communication system 100. For example, the D2D controller 125 may be implemented in the base stations 105, embedded in the user equipment 110 or at other locations within the wireless communication system 100.

Some embodiments of the D2D controller 125 authenticate user equipment for D2D communication in two different modes: the network-assist mode and the network-absent mode. In the network-assist mode, network side elements such as the base stations 105 or the D2D controller 125 are available and can communicate with user equipment 110. The user equipment 110 may therefore use a network timing reference for communication with the network as well as D2D communication. The D2D controller 125 may also provide D2D authentication, authorization, communication parameters, and the like concurrently with user equipment 110 initiating D2D communication in the network-assist mode. In the network-absent mode, the network (and, consequently, the D2D controller 125) is not available to provide a network timing reference or other information, such as signaling control and system information, to the user equipment 110. Thus, user equipment 110 that participate in network-absent D2D communication may have been pre-configured or pre-authorized with embedded control functions to perform D2D communication without any network assistance or intervention at the time of the D2D communication session. For example, the D2D controller 125 may authorize user equipment 110 for D2D communication prior to user equipment 110 initiating D2D communication so that the user equipment 110 is pre-authorized or pre-configured for D2D communication in the event that the network becomes unavailable or absent. The network-absent mode may be particularly useful to support D2D communication in emergency situations, during natural disasters, and other situations where public safety is at risk. Prior to operating in the network-absent mode, user equipment 110 may be pre-authorized and pre-installed the control functions by the D2D controller 125 for subsequent D2D communication when the network is not available to assist device discovery and communication.

User equipment 110 that are authorized to participate in D2D communication may perform device discovery to discover other user equipment 110 that are also authorized to participate in D2D communication. Some embodiments of user equipment 110 may perform a two-stage discovery procedure. In the first stage, user equipment 110 may transmit or receive discovery signals that include signatures designed for easy detection and synchronization. The discovery signals may be assigned or allocated to user equipment 110 by the D2D controller 125. For example, the discovery signals assigned to each user equipment 110 may include synchronization signals such as a UE-specific primary synchronization signal (U-PSS) and a UE-specific secondary synchronization signal (U-SSS). The U-PSS indicates a timing reference for D2D communication and a combination of the U-PSS and the U-SSS indicates resources allocated to the user equipment 110 for a discovery channel that is used to transmit discovery information for D2D communication. In the second stage, user equipment 110 may use the discovery channel to transmit and receive one or more discovery packets containing information that identifies the user equipment 110. Some embodiments of the U-PSS and U-SSS are also used as hierarchical indexes that indicate other characteristics of the D2D communication such as group membership in unicast group, a groupcast, a broadcast group, or a relay group, as discussed herein.

Figure 5:
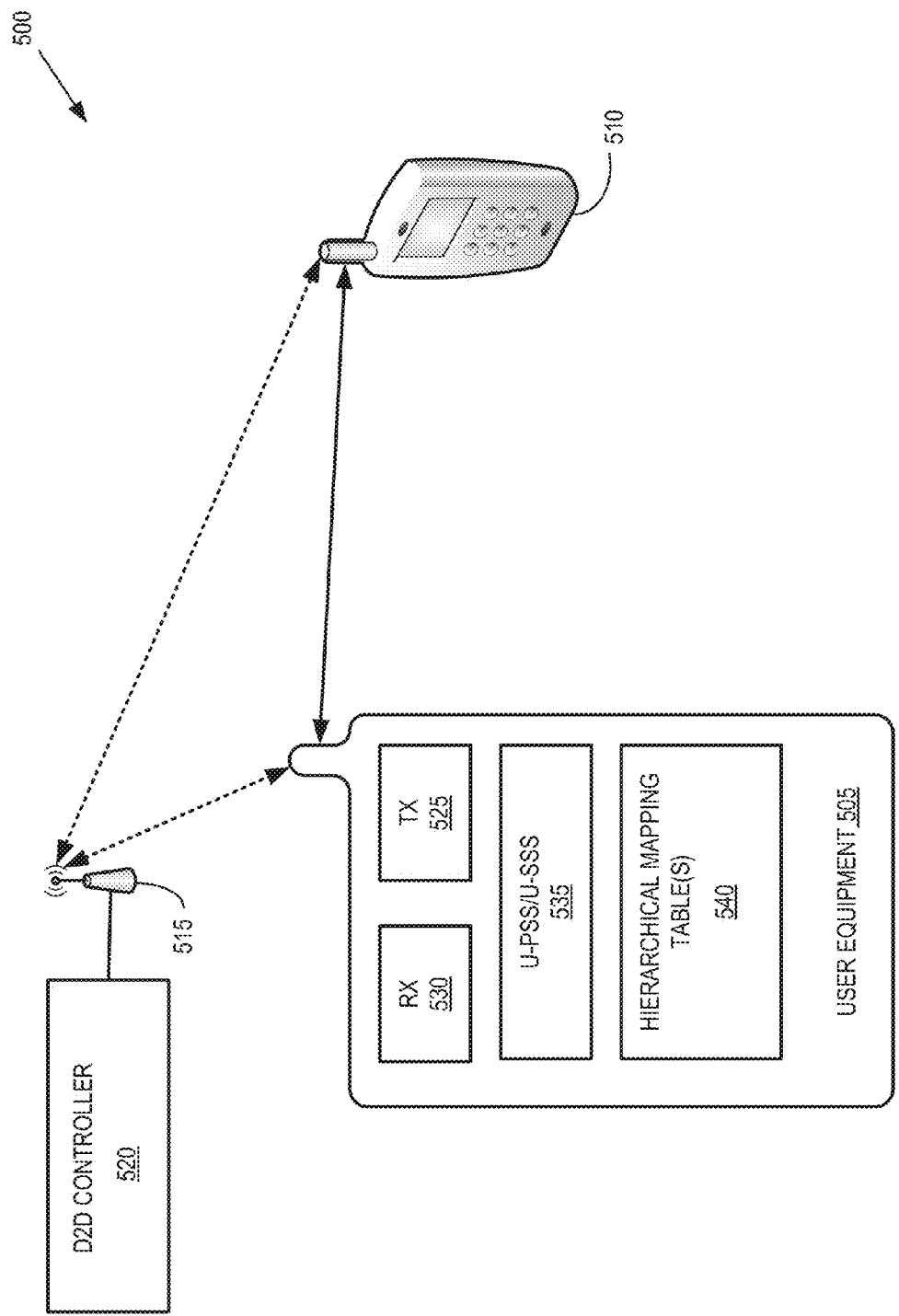
FIG. 5 is a block diagram of a second example of a wireless communication system according to some embodiments.

FIG. 5 is a block diagram of a second example of a wireless communication system 500 according to some embodiments. The wireless communication system 500 includes user equipment 505, 510, base station 515, and D2D controller 520, which may correspond to the user equipment 110, base stations 105, and D2D controller 125 shown in FIG. 1. The user equipment 505 includes a transmitter (TX 525) or transmitting signals over the air interface and a receiver (RX 530) for receiving signals over the air interface. The user equipment 505 also includes memory 535 or other storage elements for storing primary and secondary synchronization signals such as a U-PSS and a U-SSS for D2D communication. The user equipment 505 further includes memory or other storage elements for storing information representative of one or more hierarchical mapping tables 540. The primary and secondary synchronization signals may be used as indices into the hierarchical mapping tables 540, as discussed herein. In the interest of clarity, details of the user equipment 510 are not shown in FIG. 5. However, some embodiments of user equipment 510 may include the same functionality as user equipment 505.

The user equipment 505, 510 may be able to communicate with the D2D controller 520 before or during D2D communication. For example, the user equipment 505 may request authorization to perform D2D communication from the D2D controller 520 and the D2D controller 520 may respond with authorization and configuration information, as discussed herein. For another example, the D2D controller 520 may be used to coordinate the D2D communication between the user equipment 505, 510 in an in-network coverage scenario. However, the D2D controller 520 may not be available to provide authorization or configuration information in real time in an out-of-network coverage scenario but with pre-installed control function in the user equipment, as indicated by the dotted lines between the base station 515 and the user equipment 505, 510.

The D2D controller 520 may provide primary and secondary synchronization signals to the user equipment 505, e.g., in response to a request from the user equipment 505 to perform D2D communication. For example, the D2D controller 520 may provide a U-PSS and a U-SSS to the user equipment 505, which may store the U-PSS and the U-SSS in the memory 535 and subsequently use the U-PSS and the U-SSS for D2D discovery procedures, as discussed herein. The U-PSS that is assigned to the user equipment 505 may be one of a predetermined number (such as 3) of available U-PSS sequences and the U-SSS may be one of a predetermined number (such as 168) of available U-SSS sequences. The total number of unique combinations is the product of the number of available U-PSS and U-SSS sequences, e.g. 3×168=504. The number of available U-PSS or U-SSS sequences is a matter of design choice. The set of unique combinations of U-PSS and U-SSS sequences may be allocated to the user equipment 505, 510 within a predetermined group or geographic area and the same set may be used within different groups or geographic areas.

The U-PSS sequences may be generated from a frequency-domain Zadoff-Chu sequence according to:

$$d_u(n) = \begin{cases} e^{-j\frac{\pi u n(n+1)}{63}} & n = 0, 1, \ldots, 30 \\ e^{-j\frac{\pi u (n+1)(n+2)}{63}} & n = 31, 32, \ldots, 61 \end{cases}$$

The length 62 U-PSS sequence can be mapped to the central 62 REs of a slot of a radio frame such as the resource elements in the slot 400 depicted in FIG. 4. For frame structure type 1, such as the frame 200 shown in FIG. 2, the U-PSS may be mapped to the last OFDM symbol in slots 0 and 10. For frame structure type 2, such as the frame 300 shown in FIG. 3, the U-PSS may be mapped to the third OFDM symbol in subframes 1 and 6. Some embodiments may use primary synchronization signals that have predetermined lengths that differ from 62. However, sequence lengths of about 62 provide an advantageous compromise between shorter length sequences that may not produce an accurate result when correlated with comparison sequences in a receiving user equipment and longer length sequences that may take a correspondingly long time to correlate with the comparison sequences.

The detected U-PSS sequence may also be used as the scrambling sequence for the detection of the U-SSS. For example, the user equipment 505 may scramble the U-SSS using the U-PSS and the user equipment 510 may use the detected U-PSS to unscramble the U-SSS transmitted by the user equipment 505. In one embodiment, the U-PSS allocation is at a fixed location at the last symbol in slots 0 and 10 for both Frame structure 1 and 2 so that the user equipment 510 can identify the frame boundary using the U-PSS transmitted by the user equipment 505.

The U-SSS may be generated by combining two length-31 sequences to form a length 62 sequence. The sequences that are used to define the secondary synchronization signal for some subframes, such as subframe 0 and subframe 5 may be different:

$$d(2n) = \begin{cases} s_0^{(m_0)}(n)c_0(n) & \text{in subframe } 0 \\ s_1^{(m_1)}(n)c_0(n) & \text{in subframe } 5 \end{cases}$$

$$d(2n+1) = \begin{cases} s_1^{(m_1)}(n)c_1(n)z_1^{(m_0)}(n) & \text{in subframe } 0 \\ s_0^{(m_0)}(n)c_1(n)z_1^{(m_1)}(n) & \text{in subframe } 5 \end{cases}$$

where $0 \le n \le 30$. The indices $m_0$ and $m_1$ may be selected by the D2D controller 520. The sequence $d(n)$ may be mapped to resource elements (such as the resource elements shown in FIG. 4) according to:

$$a_{k,l} = d(n), n = 0, \ldots, 61$$

$$k = n - 31 + \frac{N_{RB}^{DL} N_{sc}^{RB}}{2}$$

$$l = \begin{cases} N_{symb}^{DL} - 2 & \text{in slots } 0 \text{ and } 10 \text{ for structure type } 1 \\ N_{symb}^{DL} - 1 & \text{in slots } 1 \text{ and } 11 \text{ for structure type } 2 \end{cases}$$

The D2D controller 520 may also allocate resources for transmitting the primary and secondary synchronization signals. Some embodiments of the D2D controller 520 may allocate specific resource blocks to the U-PSS and U-SSS for transmission over the air interface. For example, the center 6 RBs of one symbol in the OFDM time slots may be allocated for transmission of the U-PSS over the air interface and the center 6 RBs of another symbol in the OFDM time slots may be allocated for transmission of the U-SSS over the air interface. The allocated symbols may be selected by applying a UE-specific OFDM symbol offset in transmitting U-PSS and U-SSS. For example, user equipment 110 may transmit U-PSS and U-SSS in symbols that are offset based on a configured sounding reference signal (SRS) cyclic shift relative to a SRS symbol transmitted by the base station 515. Some embodiments of the user equipment 505, 510 may compare the acquired timing of U-PSS and U-SSS with system timing provided by the wireless communication system 500 (e.g., via the base station 515) and determine the symbol offset relative to the last symbol of SRS transmission. User equipment 505, 510 may also discover other user equipment for D2D communication after acquisition of SRS and fine tune the received timing using the other synchronization signals.

Figure 6:
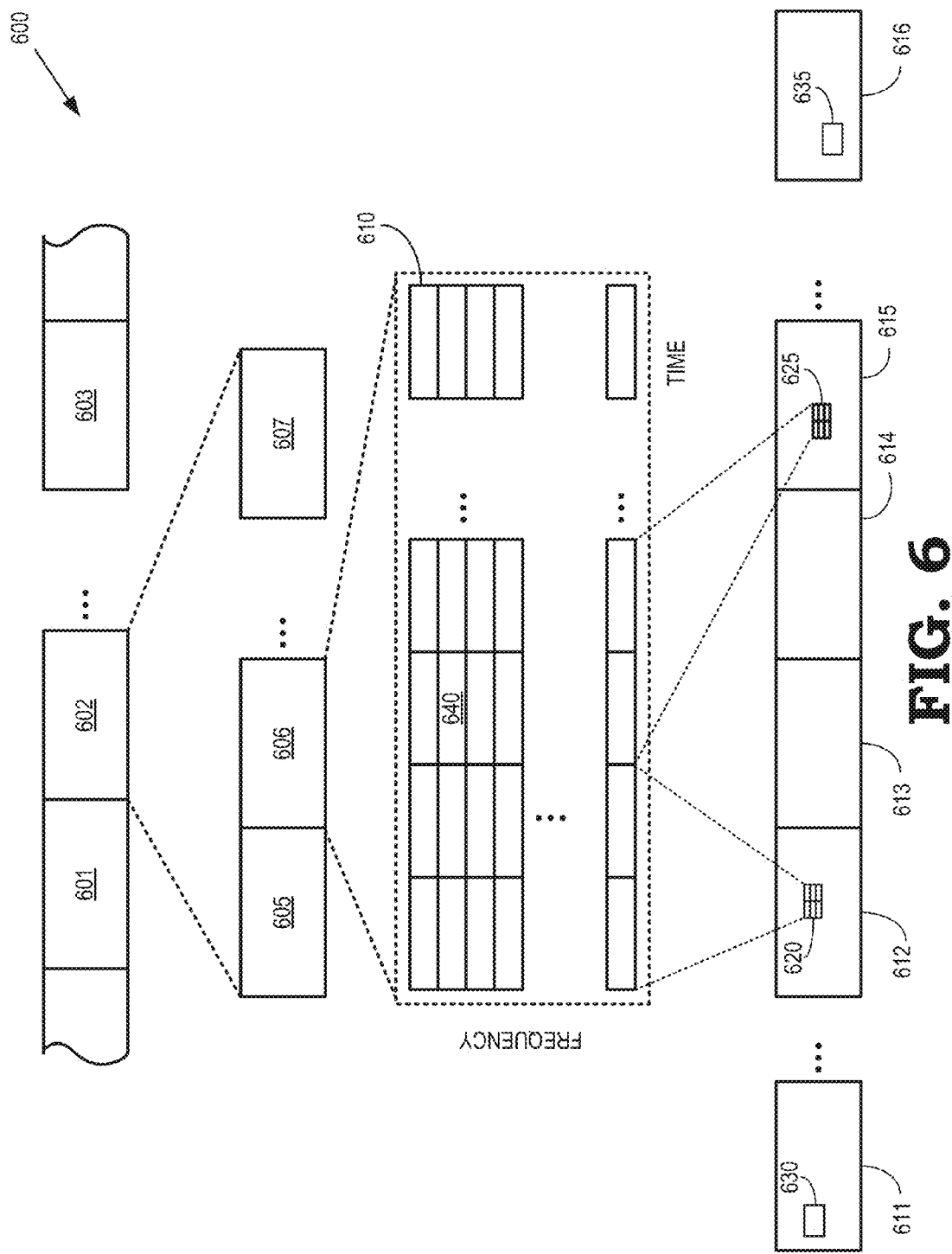
FIG. 6 is a diagram of an allocation of resources to one or more neighbor discovery channels according to some embodiments.

FIG. 6 is a diagram of an allocation 600 of resources to one or more neighbor discovery channels according to some embodiments. The allocated resources may include resource elements or resource blocks in the slot 400 shown in FIG. 4. The neighbor discovery channels may be allocated in a sequence of neighbor discovery periods 601, 602, 603 (referred to herein as "the neighbor discovery periods 601-603") that repeat over a predetermined time interval. Each of the neighbor discovery periods 601-603 are subdivided into a predetermined number of neighbor discovery subperiods 605, 606, 607 (referred to herein as "the neighbor discovery subperiods 605-607"). For example, the neighbor discovery subperiods 601-603 may be subdivided into four neighbor discovery subperiods 605-607.

The neighbor discovery subperiods 605-607 support a plurality of neighbor discovery channels 610 (only one indicated by a reference numeral in the interest of clarity) that are distributed in a time-frequency grid. Frequency is indicated along the vertical axis and time is indicated along the horizontal axis in FIG. 6. Thus, if the neighbor discovery subperiods 605-607 are divided into P frequency bands and Q time intervals, the neighbor discovery subperiods 605-607 can support up to P×Q neighbor discovery channels 610.

Subset of the neighbor discovery channels 610 can be mapped onto resources of one or more of frames 611, 612, 613, 614, 615, 616 (collectively referred to as "the frames 611-616"), which may correspond to the frame 200 shown in FIG. 2 or the frame 300 shown in FIG. 3. For example, one subset of the neighbor discovery channel 610 may be mapped onto a subframe 620 of the frame 612 and another subset of the neighbor discovery channel 610 may be mapped onto a subframe 625 of the frame 615. Configuration information that indicates the mapping of the neighbor discovery channel 610 to the frames 611-616 may be transmitted in subframes 630, 635 of the frames 611, 616, respectively. The time interval between the frames 611 and 616 is a matter of design choice and may be dynamically varied. In the interest of clarity, only one configuration subframe 630, 635 is shown in the frames 611, 616. However, in some embodiments multiple subframes may be used to convey configuration information for multiple mappings of neighbor discovery channels to subframes of the frame 611, 616. For example, different mappings may be used for user equipment that are part of different D2D communication groups, such as the fire department, the police department, and the like.

The primary and secondary synchronization signals transmitted by user equipment during D2D communication may be used to identify configuration subframes and neighbor discovery channels. Some embodiments of the U-PSS transmitted by user equipment indicate the subframe 630 in the frame 611. For example, a first user equipment may be configured with information that associates different values of the U-PSS with different configuration subframes. Second user equipment that detect the U-PSS transmitted by the first user equipment may identify the subframe 630 and monitor the information transmitted in the subframe 630 to determine the mapping of the neighbor discovery channels to subframes of the frames 611-616. The different U-PSS values may indicate different frame or subframe indices and therefore different possible neighbor discovery channel resource configurations. The second user equipment may also use the U-SSS to identify a neighbor discovery channel 640 that is allocated to the first user equipment. Since the second user equipment knows the mapping of the neighbor discovery channel structure to the resource blocks of the frames 611-616, the second user equipment can listen to the allocated resource blocks to receive the discovery information transmitted by the first user equipment using the neighbor discovery channel 640. For example, the first user equipment may transmit a packet including discovery information such as the identity of the first user equipment in the neighbor discovery channel 640. In some embodiments, the U-PSS could be used as a scrambling sequence to scramble information transmitted over the neighbor discovery channel 640.

In some embodiments, higher level identity discovery and service discovery may be enabled or supported by allocating additional resources to the neighbor discovery channel 640. The resources allocated for the neighbor discovery channel 640 could be derived implicitly through the primary and secondary synchronization signals, directed by network dedicated signaling, or broadcast in system information. For example, the discovery resources can be in the LTE carrier (e.g., co-channel allocation sharing the LTE carrier with LTE cellular transmissions) or may be in a dedicated carrier (where legacy impact is avoided but an additional carrier is needed). In a co-channel discovery resource allocation, the uplink spectrum (FDD) or subframes (TDD) are used for D2D discovery and direct communication.

Figure 7:
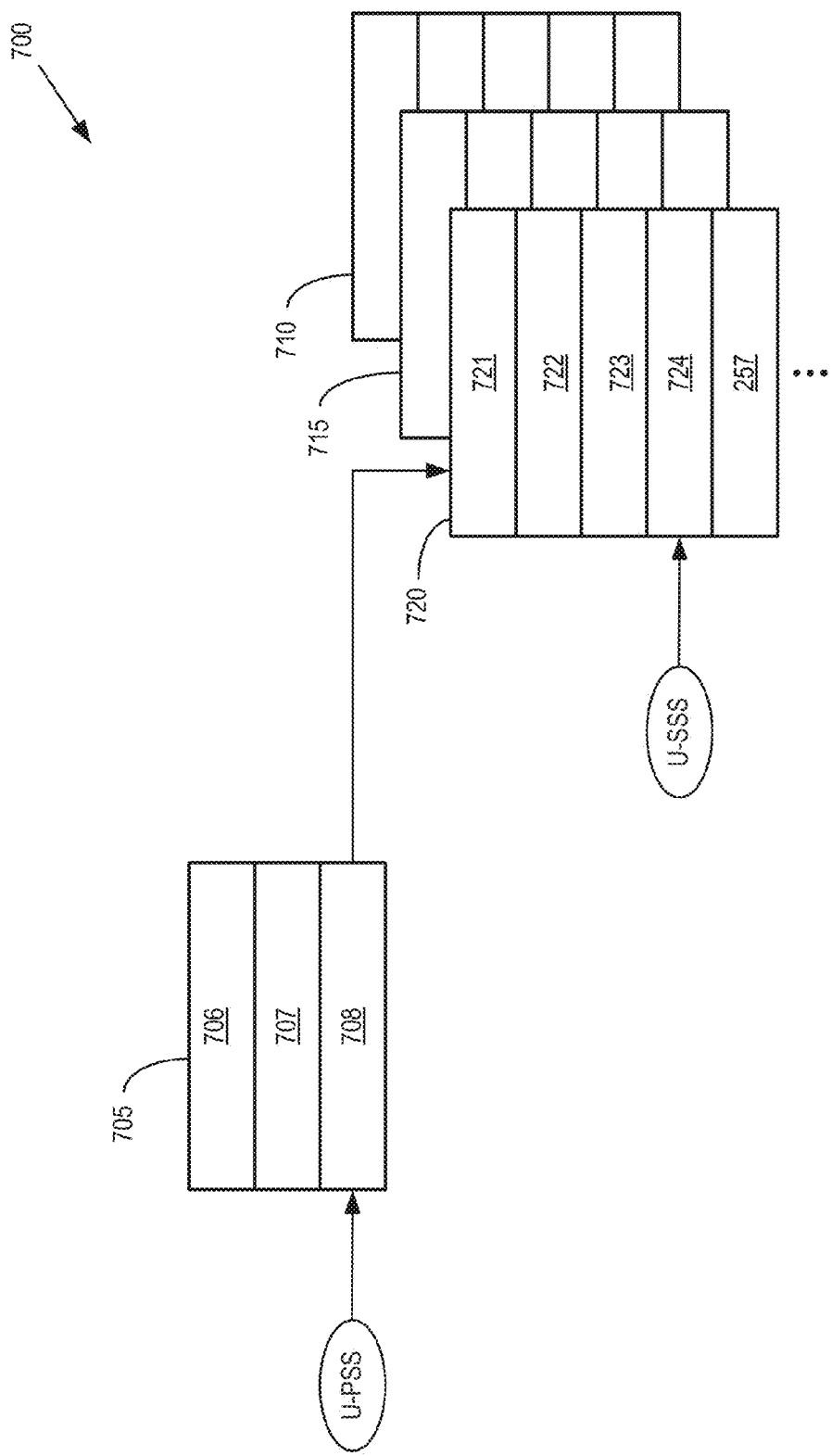
FIG. 7 is a block diagram of an example of a data structure that includes data indexed by primary and secondary synchronization signals according to some embodiments.

FIG. 7 is a block diagram of an example of a data structure 700 that includes data indexed by the primary and secondary synchronization signals according to some embodiments. Embodiments of the data structure 700 may be used to implement one or more of the hierarchical mapping tables 540 shown in FIG. 5. The primary synchronization signal (U-PSS) may be used as an index into a set 705 of entries 706, 707, 708 (referred to collectively as "the entries 706-708") that include information that characterizes the user equipment that transmitted the U-PSS. For example, the U-PSS shown in FIG. 7 points to the entry 708. The association of the U-PSS to the entries 706-708 may be configured by the network (e.g., by the D2D controller 125 shown in FIG. 1 or the D2D controller 520 shown in FIG. 5) and information indicating the association of the U-PSS to the entries 706-708 may be stored in the user equipment. Although three entries 706-708 are shown in FIG. 7, the number of entries and the corresponding number of primary synchronization signals is a matter of design choice.

The entries 706-708 also provide an indication of one or more sets 710, 715, 720 of entries 721, 722, 723, 724, 725 (referred to collectively as "the entries 721-725") that include additional information that characterizes the user equipment that transmitted the U-PSS and the secondary synchronization signal (U-SSS). The U-PSS may then be combined with the U-SSS to provide an index into one of the entries 721-725. For example, the U-PSS provides an indication (via the entry 708) to the set 720. The U-SSS may then be used as an index to the entry 724 of the set 720. The association of the U-SSS to the entries 721-725 may be configured by the network (e.g., by the D2D controller 125 shown in FIG. 1 or the D2D controller 520 shown in FIG. 5) and information indicating the association of the U-SSS to the entries 721-725 may be stored in the user equipment. Although five entries 721-725 are shown in FIG. 7, the number of entries and the corresponding number of primary synchronization signals is a matter of design choice. For example, the number of entries may be set to 168 to correspond to the number of U-SSS sequences in some embodiments.

Some embodiments of the data structure 700 may store information used to identify a discovery channel and the resources allocated to the discovery channel. For example, the entries 706-708 may include information identifying configuration subframes for a neighbor discovery channels such as the subframes 630, 635 shown in FIG. 6. The entries 721-725 may include information identifying the neighbor discovery channel allocated to the user equipment that transmits the primary and secondary synchronization signals. For example, the entries 721-725 may include information identifying the neighbor discovery channel 640 shown in FIG. 6.

Some embodiments of the data structure 700 may store information used to identify group membership of the user equipment. For example, the entries 706-708 may include information indicating whether D2D communication by the user equipment is associated with unicast transmission, groupcast transmission, broadcast transmission, or relay transmissions. The U-PSS may therefore indicate a unicast index, group identification, broadcast prefix, or relay identification. The entries 721-725 may include information indicating that the user equipment is a member of the group indicated in the entry 706-708. For example, information in the entries 721-725 may include a member identification for the user equipment indicating that the user equipment is a member of a unicast group, a groupcast, a broadcast group, or a relay group.

In some embodiments, the discovery signatures for the different types of D2D communication may be defined as follows:
  Unicast—a range of U-PSS sequences are reserved for the use of D2D unicast communication.
  Groupcast—a specific U-PSS is assigned for each group and a U-SSS is assigned each group member.
    Device searches for signature with same U-PSS for groupcast.
    Device searches for detectable U-SSS to find out the number of group member in the proximity.
  Broadcast—one or more specific U-PSS(s) are assigned for broadcast
    Device searches for specific broadcast U-PSSS
    Device searches for all detectable U-SSS as the member for broadcast.
  Relay—a specific U-PSS is assigned to those devices identified as a Relay device.
    All devices out of coverage would decode the assigned Relay U-PSS
    Once Relay U-PSS is detected, devices would start detect U-SSS to see the number of Relay devices in the proximity.

User equipment may filter received signals based on the primary synchronization signals. For example, user equipment may filter out secondary synchronization signals associated with a groupcast primary synchronization signal if the user equipment is not a member of the group. The filtered secondary synchronization signals do not need to be processed by the user equipment, which may save processing time and resources at the user equipment.

The data structure 700 may also be used to store other information that characterizes the user equipment. In some embodiments, user equipment may include multiple data structure 700 so that the primary and secondary synchronization signals can be used as indices into the multiple data structures 700 to access different types of discovery information that characterize the user equipment. For example, the hierarchical mapping tables 540 shown in FIG. 5 may include two data structures 700 that can be used to identify a neighbor discovery channel and indicate group membership for the user equipment that transmits the primary and secondary synchronization signals.

Figure 8:
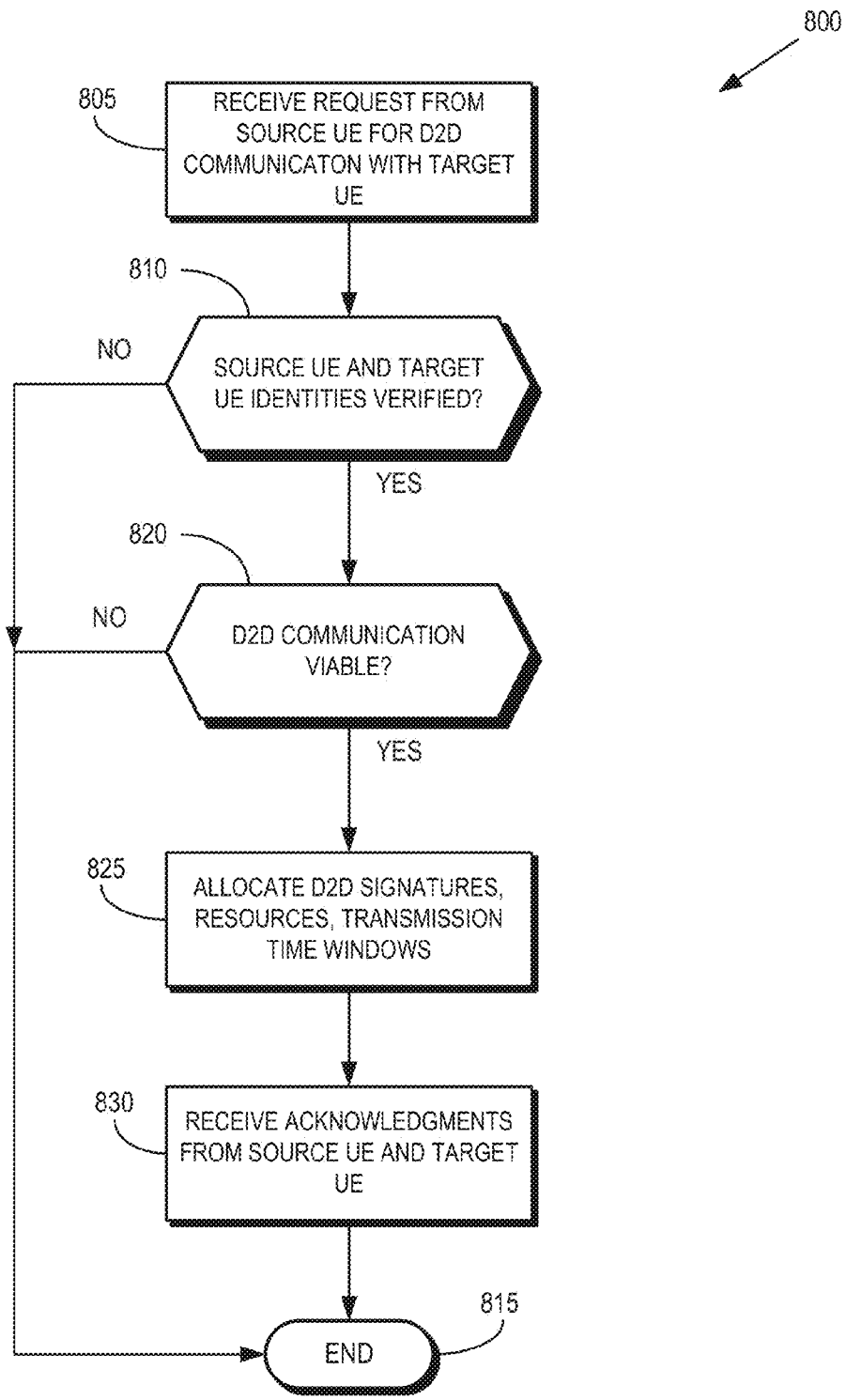
FIG. 8 is a flow diagram of a method of establishing network-assisted D2D communication between user equipment according to some embodiments.

FIG. 8 is a flow diagram of a method 800 of establishing network-assisted D2D communication between user equipment according to some embodiments. The method 800 may be implemented in embodiments of the wireless communication system 100 shown in FIG. 1 and the wireless communication system 500 shown in FIG. 5. Network-assisted D2D discovery can be performed when devices such as user equipment are under network coverage. The user equipment may then use the network connection to communicate with a controller such as a D2D controller.

At block 805, the source user equipment initiates a request to the network for D2D communication with target user equipment and the network receives the request. For example, the controller in the network may receive the request to establish D2D communication between the source and target user equipment. The request may include information identifying the source user equipment. At decision block 810, the controller attempts to verify the identity of the source target user equipment to make sure they are authorized for D2D communication. The controller may concurrently begin a signaling procedure to establish D2D communication with the target user equipment and may receive a response from the target user equipment including information identifying the target user equipment. The method 800 ends at block 815 if the controller is not able to verify the identity of the source user equipment or the target user equipment.

If the controller verifies the identity of the source user equipment and the target user equipment at decision block 810, the controller performs a viability analysis to determine the optimal path for end-to-end communication between the source and target user equipment at decision block 820. The method 800 ends at block 815 if D2D direct communication is not the best link for end-to-end communication. If the controller determines (at decision block 820) that D2D direct communication is the best link for end-to-end communication, the controller triggers a D2D discovery procedure.

At block 825, the controller allocates D2D signatures (e.g., primary and secondary synchronization signals) to the source and target user equipment. The controller also allocates resources that are used to transmit and receive the D2D signatures and provides information indicating transmission time windows that should be used for transmission or reception of the D2D signatures. At block 830, the controller receives acknowledgments from the source user equipment and the target user equipment indicating that the configuration information has been successfully received and the source and target user equipment have discovered each other. The method 800 may then end at block 815.

Figure 9:
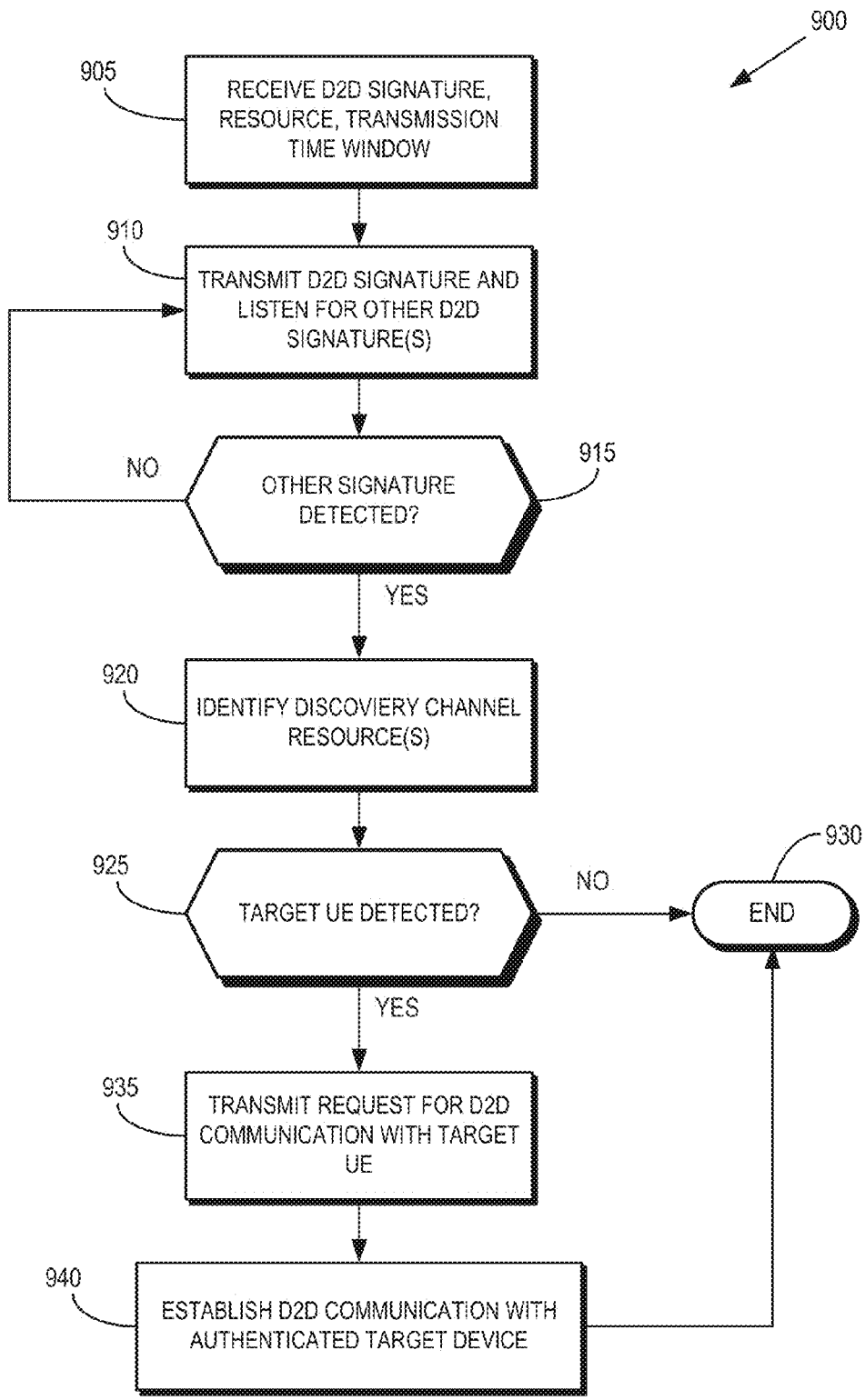
FIG. 9 is a flow diagram of a method of establishing autonomous D2D communication between user equipment with network assistance according to some embodiments.

FIG. 9 is a flow diagram of a method 900 of establishing autonomous D2D communication between user equipment with network assistance according to some embodiments. The method 900 may be implemented in embodiments of the wireless communication system 100 shown in FIG. 1 and the wireless communication system 500 shown in FIG. 5. Autonomous D2D discovery may be performed by user equipment when the user equipment is under network coverage so that the user equipment can communicate with a controller such as the D2D controller 125 shown in FIG. 1 or the D2D controller 520 shown in FIG. 5. At block 905, user equipment receive information indicating D2D signatures, resources for transmitting or receiving the D2D signatures, and a transmission time interval for the D2D signatures. For example, the controller may allocate primary and secondary synchronization signals to the user equipment, resources that are used to transmit and receive the D2D signatures, and transmission time windows in response to the controller verifying and registering the user equipment as a D2D device.

At block 910, each user equipment transmits its allocated D2D signature in the allocated resources and transmission time windows. User equipment may also listen for D2D signatures transmitted by the user equipment in the allocated resources during the transmission time window. At decision block 915, each user equipment attempts to detect the signatures of other user equipment. The user equipment may continue to listen for D2D signatures as long as no other signature is detected. If the user equipment detects a D2D signature transmitted by another user equipment, the receiving user equipment uses the detected D2D signature to identify discovery channel resources used by the transmitting user equipment at block 920. For example, the receiving (source) user equipment may use the detected U-PSS and U-SSS of the transmitting user equipment to identify the neighbor discovery channel that the transmitting user equipment uses to transmit discovery packets that include information including the identity of the transmitting user equipment.

At decision block 925, the source user equipment uses the identity of the transmitting user equipment to verify that it is the target user equipment for the D2D communication. If the transmitting user equipment is not verified as the target, the method 900 may end at block 930. In response to the source user equipment verifying the identity of the transmitting user equipment as the target user equipment for D2D communication, the source user equipment transmits (at block 935) a request for D2D communication with the target user equipment to the controller. At block 940, the controller may verify and authenticate the D2D communication request and begin the signaling procedure for D2D direct communication between the source user equipment and the target user equipment. The method 900 may then end at block 930.

Figure 10:
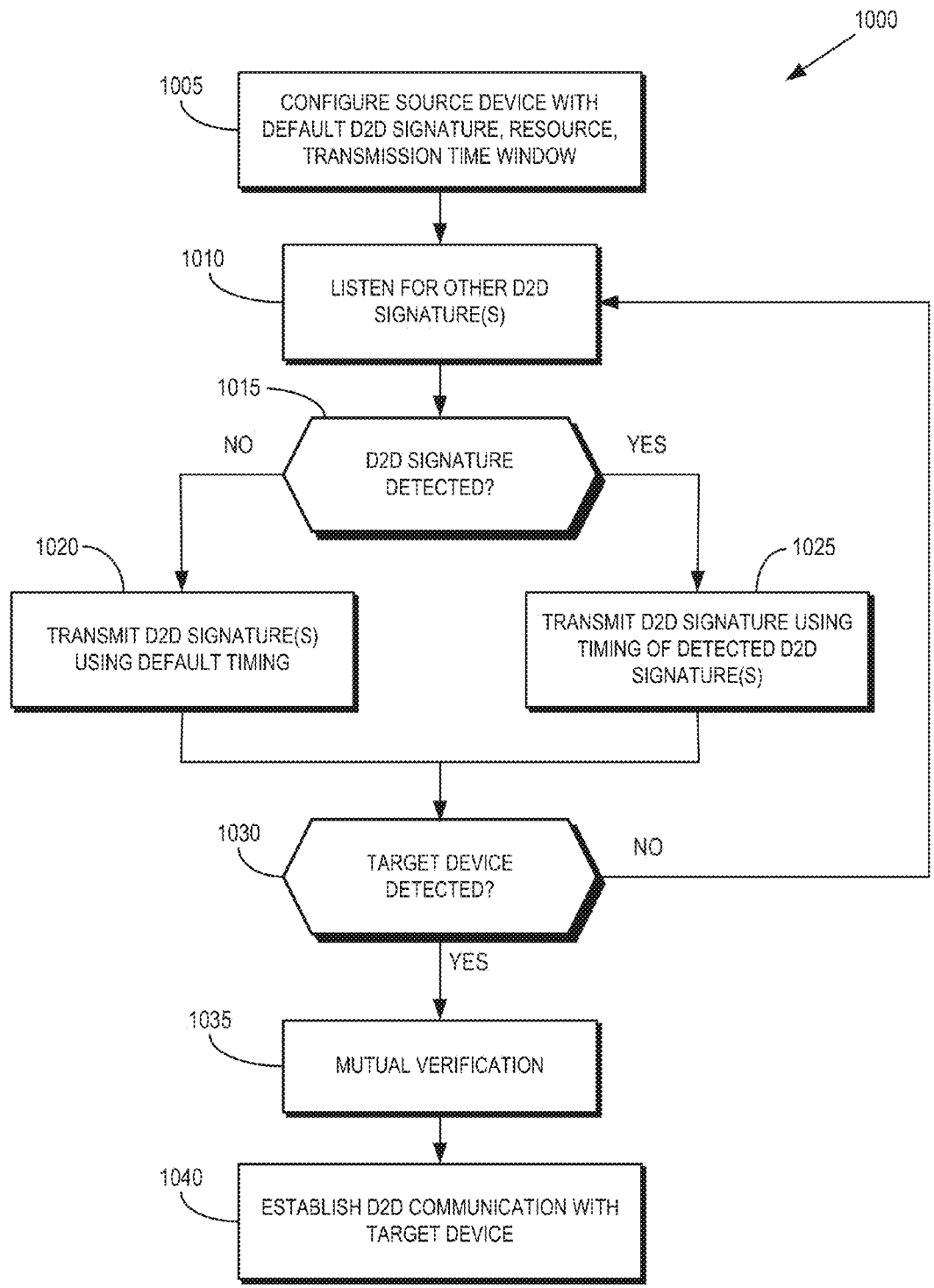
FIG. 10 is a flow diagram of a method of establishing autonomous D2D communication between user equipment without network assistance according to some embodiments.

FIG. 10 is a flow diagram of a method 1000 of establishing autonomous D2D communication between user equipment without network assistance according to some embodiments. The method 1000 may be implemented in embodiments of the wireless communication system 100 shown in FIG. 1 and the wireless communication system 500 shown in FIG. 5. Autonomous D2D discovery may also be performed by user equipment that are outside of network coverage or the network is otherwise unavailable so that the user equipment are not able to communicate with entities in the network such as a D2D controller. At block 1005, user equipment is configured with information indicating D2D signatures, resources for transmitting or receiving the D2D signatures, and a transmission time interval for the D2D signatures. In some embodiments, the user equipment may be configured prior to the user equipment entering the out-of-coverage scenario. For example, a controller such as a D2D controller may allocate primary and secondary synchronization signals to the user equipment, resources that are used to transmit and receive the D2D signatures, and transmission time windows in response to the controller verifying and registering the user equipment as a D2D device. Some embodiments of the user equipment may be pre-configured with information indicating the D2D signatures, resources, and transmission time intervals without necessarily establishing connection with the network. At some point after configuring the user equipment, the network becomes unavailable or the user equipment is outside of network coverage.

At block 1010, user equipment listen for other D2D signatures on the configured resources and during the configured transmission time intervals. For example, the user equipment may attempt to contact the network and then, in response to failure to detect wireless connectivity with the network, the user equipment may listen for other D2D signatures from other user equipment. At decision block 1015, the user equipment determines whether any other D2D signatures have been detected. If not, the user equipment transmits its own D2D signature using a default timing reference at block 1020. For example, the user equipment may transmit its D2D signature at an arbitrary time or based on a global timing reference such as a Global Positioning System (GPS) timing reference or a global navigation satellite system (GNSS) timing reference. If the user equipment detects one or more other D2D signatures at block 1015, the user equipment may synchronize to the timing of the one or more transmitting user equipment using the one or more detected D2D signatures. The user equipment may then transmit its D2D signature using the timing reference provided by the detected D2D signatures at block 1025. The timing reference provided by the detected D2D signatures may also be used to listen for additional signatures from other user equipment in proximity to the user equipment.

At decision block 1030, each of the user equipment uses any detected D2D signatures of other user equipment to identify the resources allocated to the corresponding discovery channel or discovery channels used by the other user equipment. Source user equipment (e.g., the user equipment that detected the D2D signature of another user equipment) may then use the packets transmitted on the one or more discovery channels to verify the identities of the other (target) user equipment. If the source user equipment does not verify that the other user equipment is a target user equipment for D2D communication, the source user equipment may continue to listen for other D2D signatures. If the source user equipment verifies that the other user equipment is a target user equipment for the D2D communication, the source user equipment may send a request for D2D communication using the one or more discovery channels of the one or more verified target user equipment.

At block 1035, the source and target user equipment perform mutual verification. For example, the target user equipment may use a default verification procedure to verify the identity of the source user equipment. The target user equipment may then send an acknowledgment to the source user equipment in response to successfully verifying the identity of the source user equipment. The source user equipment may verify the identity of the target user equipment after receiving the acknowledgment. Source user equipment may begin the signaling procedure for D2D communication between the source and target user equipment in response to verifying the identity of the target user equipment.

Embodiments of the two-stage signature design described herein may have one or more of the following advantages. The primary and secondary synchronization signals may be cell agnostic because the signature allocation is independent of the device location or whether it is under coverage of a serving cell or out of network coverage. The relatively short sequence length of the primary and secondary synchronization signals reduces the radio resources used to support transmission of the D2D signatures and correspondingly reduces the processing complexity of signature detection. A large number of signatures may be available because the total number of signatures is the product of the number of primary synchronization signals and the number of secondary synchronization signals. The D2D signature of the user equipment can be unique within a cluster area for cluster group because each user equipment is assigned a unique signature and the number of available signatures can be configured to be more than the number of devices in an area. The collision probability is also reduced by the large number of unique D2D signatures. Moreover, embodiments of the primary and secondary synchronization signals can be configured to provide good cross-correlation properties.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)). The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
   transmitting, from first user equipment, a first synchronization signal and a second synchronization signal that are assigned to the first user equipment for device-to-device (D2D) communication, wherein the first synchronization signal indicates a timing reference for D2D communication and a combination of the first synchronization signal and the second synchronization signal indicate resources allocated to the first user equipment to transmit discovery information for D2D communication.

2. The method of claim 1, wherein transmitting the first synchronization signal comprises transmitting a frequency-domain Zadoff-Chu sequence that indicates frame timing boundaries for D2D communication.

3. The method of claim 1, wherein transmitting the second synchronization signal comprises transmitting a second synchronization signal selected from a set of synchronization signals that each have a predetermined length.

4. The method of claim 1, wherein transmitting the first synchronization signal comprises transmitting a first synchronization signal indicative of at least one subframe allocated for transmission of system information used to configure a plurality of discovery channels for conveying discovery information for D2D communication.

5. The method of claim 4, wherein transmitting the second synchronization signal comprises transmitting a second synchronization signal indicative of at least one of the plurality of discovery channels such that the combination of the first synchronization signal and the second synchronization signal indicates the resources allocated to the first user equipment to transmit discovery information for D2D communication.

6. The method of claim 5, further comprising:
   transmitting information identifying the first user equipment using the resources allocated to the first user equipment to transmit discovery information for D2D communication.

7. The method of claim 6, further comprising:
   scrambling the transmitted information identifying the first user equipment using the first synchronization signal as a scrambling sequence.

8. The method of claim 1, wherein transmitting the first synchronization signal comprises transmitting a first synchronization signal indicative of at least one of a unicast group, a groupcast, a broadcast group, and a relay group, and wherein transmitting the second synchronization signal comprises transmitting a second synchronization signal identifying the first user equipment as a group member of at least one of the unicast group, the groupcast, the broadcast group, and the relay group indicated by the first synchronization signal.

9. The method of claim 1, wherein transmitting the first synchronization signal and the second synchronization signal comprises transmitting the first and second synchronization signals in response to signaling from a D2D controller assigning the first and second synchronization signals to the first user equipment, allocating resources for transmitting the first and second synchronization signals, and defining a time window for transmission of the first and second synchronization signals.

10. The method of claim 1, wherein transmitting the first synchronization signal and the second synchronization signal comprises, in response to failing to detect signals provided by a D2D controller, transmitting the first and second synchronization signals using previously configured values of the first and second synchronization signals, resources for transmitting the first and second synchronization signals, and a time window for transmission of the first and second synchronization signals.

11. The method of claim 10, wherein transmitting the first and second synchronization signals comprises detecting third and fourth synchronization signals transmitted by second user equipment and transmitting the first and second synchronization signals based on a timing reference indicated by the third and fourth synchronization signals.

12. A method, comprising:
detecting, at first user equipment, a first synchronization signal and a second synchronization signal that are assigned to second user equipment for device-to-device (D2D) communication, wherein the first synchronization signal indicates a timing reference for D2D communication and a combination of the first synchronization signal and the second synchronization signal indicate resources allocated to the second user equipment to transmit discovery information for D2D communication.

13. The method of claim 12, wherein detecting the first synchronization signal comprises detecting a frequency-domain Zadoff-Chu sequence that indicates frame timing boundaries for D2D communication.

14. The method of claim 12, wherein detecting the second synchronization signal comprises detecting a second synchronization signal selected from a set of synchronization signals that each have a predetermined length.

15. The method of claim 12, wherein detecting the first synchronization signal comprises detecting a first synchronization signal indicative of at least one subframe allocated for transmission of system information used to configure a plurality of discovery channels to convey discovery information for D2D communication.

16. The method of claim 15, wherein detecting the second synchronization signal comprises detecting a second synchronization signal indicative of at least one of the plurality of discovery channels and identifying the resources allocated to the second user equipment to transmit discovery information for D2D communication.

17. The method of claim 16, further comprising:
receiving information identifying the second user equipment using the resources allocated to the second user equipment to transmit discovery information for D2D communication; and
verifying an identity of the second user equipment based on the received information.

18. The method of claim 17, further comprising:
unscrambling the received information identifying the second user equipment using the first synchronization signal as a scrambling sequence.

19. The method of claim 12, wherein receiving the first synchronization signal comprises receiving a first synchronization signal indicative of at least one of a unicast group, a groupcast, a broadcast group, and a relay group.

20. The method of claim 19, wherein receiving the second synchronization signal comprises filtering the second synchronization signal based on the first synchronization signal so that the second synchronization signal identifying the second user equipment as a group member is selectively processed based on membership of the first user equipment in at least one of the unicast group, the groupcast, the broadcast group, and the relay group.

21. User equipment, comprising:
a transmitter to transmit a first synchronization signal and a second synchronization signal that are assigned to the user equipment for device-to-device (D2D) communication, wherein the first synchronization signal indicates a timing reference for D2D communication and a combination of the first synchronization signal and the second synchronization signal indicate resources allocated to the user equipment to transmit discovery information for D2D communication.

22. The user equipment of claim 21, wherein the transmitter is to transmit a first synchronization signal indicative of at least one subframe allocated for transmission of system information used to configure a plurality of discovery channels for conveying discovery information for D2D communication.

23. The user equipment of claim 22, wherein the transmitter is to transmit a second synchronization signal indicative of at least one of the plurality of discovery channels such that the combination of the first synchronization signal and the second synchronization signal indicates the resources allocated to the user equipment to transmit discovery information for D2D communication.

24. The user equipment of claim 23, wherein the transmitter is to transmit information identifying the user equipment using the resources allocated to the user equipment to transmit discovery information for D2D communication.

25. User equipment, comprising:
a receiver to detect a first synchronization signal and a second synchronization signal that are assigned to an other user equipment for device-to-device (D2D) communication, wherein the first synchronization signal indicates a timing reference for D2D communication and a combination of the first synchronization signal and the second synchronization signal indicate resources allocated to the other user equipment to transmit discovery information for D2D communication.

26. The user equipment of claim 25, wherein the receiver is to detect a first synchronization signal indicative of at least one subframe allocated for transmission of system information used to configure a plurality of discovery channels to convey discovery information for D2D communication.

27. The user equipment of claim 26, wherein the receiver is to detect a second synchronization signal indicative of at least one of the plurality of discovery channels and identifying the resources allocated to the other user equipment to transmit discovery information for D2D communication.

28. The user equipment of claim 27, wherein the receiver is to receive information identifying the other user equipment using the resources allocated to the other user equipment to transmit discovery information for D2D communication, and wherein the user equipment is to verify an identity of the other user equipment based on the received information.

* * * * *